June 17, 1958    V. I. CHICANE    2,839,257
WIRE REEL
Filed Dec. 14, 1953

INVENTOR.
Verl I. Chicane
BY
ATTORNEY ns patent office 2,839,257
Patented June 17, 1958

2,839,257

WIRE REEL

Verl I. Chicane, Cottonwood, Idaho

Application December 14, 1953, Serial No. 398,079

2 Claims. (Cl. 242—86.5)

This invention is a wire reel particularly adapted to form coils of wire.

Insofar as I am aware, the wire reels presently in use today are designed for unrolling coils of wire by use of a mobile vehicle, thus laying the wire along a source commensurate with the position it will occupy when applied to the supporting posts. For picking up wire, the reels are normally adapted for stationary location and the power mechanism drives the reel dragging the wire over the surface of the ground and winding it thereupon. This causes the wire, whether it be a single or double strand barbed or other type wire such as hog fencing, to pick up stubble and other trash on the surface of the ground and also to gather snow and frost at the fall time of the year, thus resulting in a roll of wire which has contained therein much trash capable of storing moisture which causes the wire to rust during storage. It is therefore one object of this invention to provide means for coiling relatively clean wire after it has been removed from a fence and placed upon the ground by coiling the wire while traveling therewith instead of dragging the wire over the ground.

Another object of the invention lies in the provision of a combined tractor and wire reel, said wire reel being driven from a power shaft of said tractor and disposed at an axis parallel to the axis of said tractor wheels.

Another object of the invention lies in the provision of a combined tractor and wire reel wherein the reel includes a spool having a collapsible arbor and a removable side plate whereby a coil of wire may be removed from the spool.

Another object of the invention lies in the provision of a combined tractor and wire reel adapted to be driven from the power shaft of said tractor and including a transmission having a ratio compensating device to permit the reel to rotate at varying speeds.

These and other objects of the invention will become apparent during the course of the following description. The nature and advantages of my invention will appear more fully from the following description and the accompanying drawings wherein a preferred form of the invention is shown. It should be understood, however, that the drawings and description are illustrative only and are not intended to limit the invention except in so far as it is limited by the claims.

Figure 1:
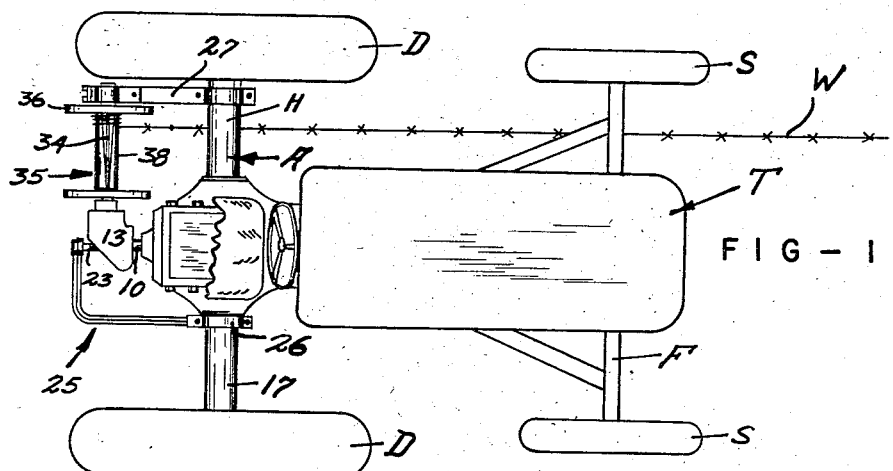
Figure 1 is a plan view of a tractor including my improved wire reel.
Figures 3, 4:
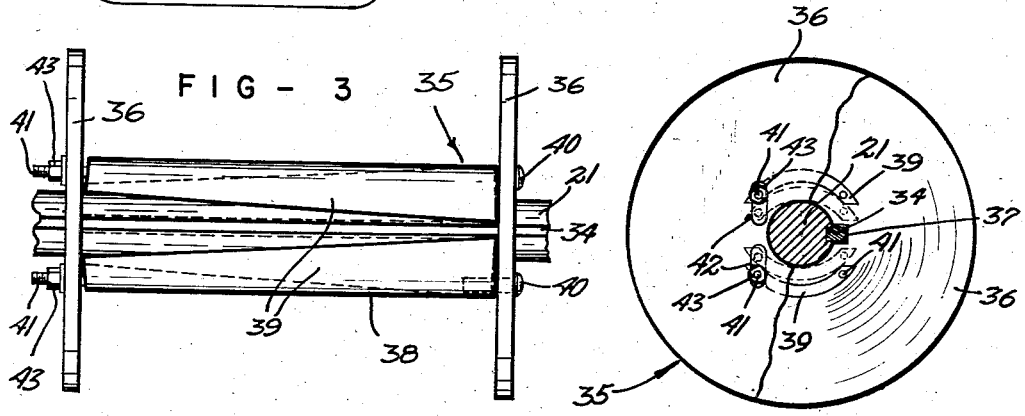
Figure 3 is a fragmentary elevation showing the reel spool mounted upon its shaft.
Figure 4 is an end elevation of the spool mounted upon its shaft and having parts broken away for convenience of illustration.

Referring now more particularly to the drawing, I have shown in Figure 1 a plan view of a tractor indicated in general by the letter T and which has the usual driving wheels D and front steering wheels S journaled respectively at the outer ends of the usual rear axle A and the forward axle F. The rear axle A is provided with the usual housing H and the driving axle B concentric and disposed therein.

Figures 2, 5:
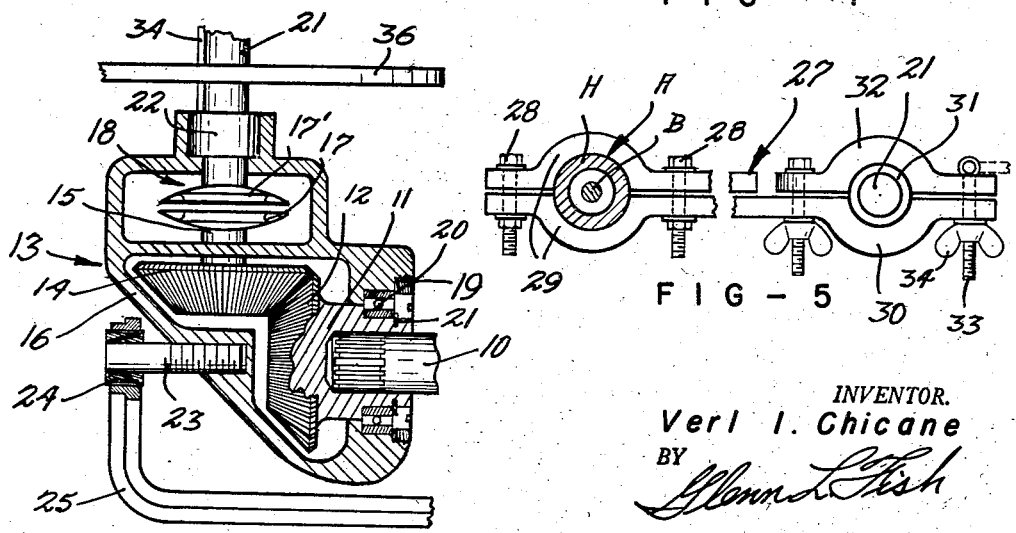
Figure 2 is a horizontal fragmentary cross section taken through the power transmission mechanism.
Figure 5 is a vertical view partially in cross section and partially in side elevation showing the spool support arm.

Extending rearwardly therefrom the tractor is provided with a conventional power takeoff shaft 10 having its axis extending parallel with the normal movement of the tractor. The power takeoff 10 is provided with splines at its end which cooperate with an internally splined hub 11 of a miter gear 12 forming a part of a power transmission mechanism 13. The miter gear 12 meshes with a companion miter gear 14 carried by stub shaft 15 journaled within the transmission housing 16 and adapted to drive one element 17 of a fluid coupling 18. As indicated in Figure 2, the hub 11 of the miter gear 12 is provided with a bearing receiving face. A cooperating bearing 19 supports the gear 12 within the housing 13 and is secured therein by means of bearing retainers 20 and 21 cooperating with the housing and the hub respectively.

Coaxial with the power takeoff shaft 10, the housing 13 is provided with a journal pin 23 which is carried in a radial thrust bearing 24 confined at the end of an angular arm 25 securely fastened at 26 to the housing H of the rear axle A.

A spool shaft 21 extends into the housing 13 and is carried by a bearing 22 and is secured to the second element 17' of the fluid coupling 18. The fluid coupling is provided as a compensating device to compensate for the variations in rotation of the power takeoff shaft 10 and the spool shaft 21 as will be hereinafter described.

The free end of spool shaft 21 is supported by a rearwardly extending support arm 27 securely clamped to the opposed axle housing H by means of bolts 28 cooperating with companion yoke portions 29 of the support arm 27. At its rear end the support arm 27 is provided with a saddle 30 adapted to receive a bushing or bearing 31, rotatably mounted on the free end of the spool shaft 21, and is secured therein by means of a yoke 32 removably secured in clamping relation to the saddle 30 for confining the bushing 31 and therefore the previously identified free end of the spool shaft 21. The rearward end of the support arm 27 and the yoke 32 are bifurcated and a clamping bolt 33 is pivotally secured to the yoke and movable vertically between the bifurcations where it is clamped by means of wing nut 34, thus providing a quick detachable means of securing the bearing or bushing 31 on the arm 27. This supports the spool shaft 21 in its normal horizontal position wherein the axis of the shaft is disposed at right angles to the axis of the power takeoff shaft 10 and when the yoke 32 is released, the spool shaft 21 may be vertically tilted about the axis of the shaft 10 and journal pin 23 moved to a vertical position.

The spool shaft 21 is provided with an elongated keyway which supports a key 34 extending substantially thereof and terminating at the bearings 22 and 31. The spool shaft 21 is adapted to receive the spool indicated in general by the numeral 35 and inspection of the drawing will show that the spool 35 is provided with spaced side plates 36 each having a central aperture adapted to slide longitudinally over the spool shaft 21 and having communicating with the aperture a keyway 37 cooperating with the key 34 to support the spool for rotation with the spool shaft 21.

Intermediate the side plates 36 the spool is provided with a segmental arbor 38 which is formed of two substantially semicylindrical tapered sections 39—39 and each section has its largest end pivotally secured to the inner side plate 36 by means of bolts 40 or other fastening means passing loosely through apertures (not shown) formed in the side plate 36. The opposed smaller ends of the sections 39 are provided with stud bolts 41 which are secured in the ends of the sections 39 and extend through pairs of parallel slots 42 to provide for movement of the sections 39 from defining a substantially cylindrical peripheral shape to a substantially conical peripheral shape by releasing the clamping nuts 43 associated with the bolts 41. It will thus be seen that the end plate 36 opposed to the transmission end of shaft 21 may be selectively removed from the spool and the arbor 39 collapsed, thereby permitting removal of a coil of wire wound upon the spool 35.

In employing the present invention for forming coils of wire from an elongated wire which has been removed from a fence post, a tractor is positioned over the wire with the wire extending parallel with the normal direction of movement of the tractor and the starting end of the wire is fixed to the spool 35 in any manner found convenient. The power takeoff shaft 10 is engaged with the motor and is revolved thus imparting torque to the spool shaft 21, however, the fluid coupling 18 acts as a compensator and provides only sufficient torque to the spool shaft 21 as is found to be necessary to maintain the wire W taut, but not sufficient to drag the wire over the surface of the ground. The tractor drive mechanism is then engaged and the tractor is driven over the wire at a speed suitable to wind the wire upon the spool 35. This prevents stubble and other growth from being caught on the barbs of the wire W and thus provides for forming a coil of relatively clean wire for storage throughout the winter months whereupon it may be used again in the spring to construct a fence.

It is obvious that the spool 35 must rotate at a speed greater than the relative rotation of the wheel axles when the wire is first being wound upon the arbor than the speed at which it will be required to rotate when the spool is substantially full of wire because of the greater diameter and greater circumference upon which the wire is being rolled, therefore further necessitating a compensating device such as the fluid coupler 18.

Having thus described my invention, I claim:

1. In combination with a tractor having a rearwardly presented horizontal power shaft; a wire reel comprising a transverse normally horizontal shaft supported at one end on said tractor for vertical tilting movement about the axis of said power shaft to an axially vertical position; a transmission including a ratio compensating device operably connecting said power shaft and said wire reel; a wire spool having spaced side plates fixed for rotation with said second named shaft; an arbor intermediate said plates and having one end pivotally secured to its companion side plate and the opposed end releasably secured to the opposed side plate for movement of the releasably secured end inwardly to define a tapering configuration toward said releasably secured end; and means on the tractor releasably supporting said second named shaft for rotation at its end opposed to said power shaft in a normal horizontal position.

2. The invention as defined in claim 1 wherein the side plate releasably secured to said arbor is disposed toward the means releasably supporting said pool and is axially movable from said shaft when released from said arbor whereby a coil of wire may be removed axially from said spool.

References Cited in the file of this patent
UNITED STATES PATENTS

| | | |
|---|---|---|
| 818,878 | Eichhoff | Apr. 24, 1906 |
| 869,010 | McIntyre | Oct. 22, 1907 |
| 1,670,886 | Fellows | May 22, 1928 |
| 1,831,848 | Doney et al. | Nov. 17, 1931 |
| 2,507,272 | Rosendahl | May 9, 1950 |
| 2,529,185 | Proctor | Nov. 7, 1950 |
| 2,605,976 | Henggeler | Aug. 5, 1952 |
| 2,662,701 | Weber | Dec. 15, 1953 |